(12) United States Patent
Gross

(10) Patent No.: US 8,517,397 B2
(45) Date of Patent: Aug. 27, 2013

(54) COLLAPSIBLE DOLLY FOR USE WITH A TRUSS

(75) Inventor: Scott Gross, Mississauga (CA)

(73) Assignee: Production Resource Group, LLC, New Windsor, NY (US)

( * ) Notice: Subject to any disclaimer, the term of this patent is extended or adjusted under 35 U.S.C. 154(b) by 475 days.

(21) Appl. No.: 12/689,686

(22) Filed: Jan. 19, 2010

(65) Prior Publication Data

US 2010/0181738 A1    Jul. 22, 2010

Related U.S. Application Data

(60) Provisional application No. 61/145,673, filed on Jan. 19, 2009.

(51) Int. Cl.
*B62B 3/02* (2006.01)
*B62B 3/10* (2006.01)

(52) U.S. Cl.
USPC ............................ 280/35; 280/79.11; 280/651

(58) Field of Classification Search
USPC .............. 280/79.11, 79.7, 79.3, 638, 35, 639, 280/38, 651, 47.34, 47.35
See application file for complete search history.

(56) References Cited

U.S. PATENT DOCUMENTS

| | | | | |
|---|---|---|---|---|
| 2,565,820 | A | * | 8/1951 | Machanic ........................ 280/38 |
| 3,551,001 | A | * | 12/1970 | Wilson ........................ 280/47.34 |
| 4,512,117 | A | * | 4/1985 | Lange ................................. 52/6 |
| 4,837,665 | A | * | 6/1989 | Hoyer et al. ..................... 362/96 |
| 4,862,336 | A | * | 8/1989 | Richardson et al. ........... 362/285 |
| 5,237,792 | A | * | 8/1993 | Oberman et al. ................ 52/645 |
| 5,278,742 | A | * | 1/1994 | Garrett .......................... 362/233 |
| 5,335,468 | A | * | 8/1994 | Oberman et al. ................ 52/645 |
| 5,432,691 | A | * | 7/1995 | Garrett et al. .................. 362/233 |
| 5,599,031 | A | * | 2/1997 | Hodges ....................... 280/79.11 |
| 5,617,931 | A | * | 4/1997 | Zygmun et al. ............... 182/145 |
| 5,924,577 | A | * | 7/1999 | Gessert ......................... 211/41.1 |
| 6,026,626 | A | * | 2/2000 | Fisher ............................. 52/633 |
| 8,099,913 | B1 | * | 1/2012 | Dodd .............................. 52/143 |
| 2002/0105169 | A1 | * | 8/2002 | Dahl ............................. 280/651 |
| 2006/0087092 | A1 | * | 4/2006 | Chubb ....................... 280/79.11 |
| 2009/0173033 | A1 | * | 7/2009 | Baxter, Jr. ....................... 52/646 |

* cited by examiner

*Primary Examiner* — J. Allen Shriver, II
*Assistant Examiner* — Emma K Frick
(74) *Attorney, Agent, or Firm* — Law Office of Scott C. Harris, Inc.

(57) ABSTRACT

A foldable dolly for use with a truss. The dolly is also extendable.

22 Claims, 9 Drawing Sheets

COLLAPSIBLE DOLLY FOR USE WITH A TRUSS

This application claims priority from provisional application 61/145,673, filed Jan. 19, 2009, the entire contents of which are herewith incorporated by reference.

BACKGROUND

Lighting and other gear for an event, e.g., a concert, play or other gathering may be held on trusses. For example, a truss may include a series of poles which extend substantially parallel to one another and, are connected together to form a square or rectangle in cross section. Cross pieces on the truss that hold the pieces relative to one another and provide structural support.

The trusses need to have significant amounts of strength, and hence they use materials that can be heavy. Also the trusses are usually raised to a spot above the stage. Often the stage is assembled by wheeling out the trusses on dollies. The lights are hung on the trusses on the ground while they are still on the dollies. The trusses are subsequently raised so that they are hanging from the roof with the lights still on them. The dollies are then removed from that area and stored until the trusses are lowered.

Dollies for trusses include the "Obie Low Pro" and the "Mega Truss dolly".

SUMMARY

The present application describes a number of features for a new truss dolly.

The inventor recognizes that the dollys take up significant space when they are not being used, and when they are being transported. According to a first aspect, the dollies for the trusses can be folded into a stowed position in which they use less space.

The dollies can be more easily stored at an area outside of the active event area and to be transported.

According to another aspect, the dollies are "telescopic" so that they can be adjusted to set which or how far off the ground they hold the trusses. This allows larger light to be placed on the dollies.

Another aspect describes how the telescopic feature can allow use one truss for multiple different kinds of lights.

Yet another feature describes how the dolly and truss have specified structures that holds them together and allows them to move one relative to another.

DETAILED DESCRIPTION

Figure 1:
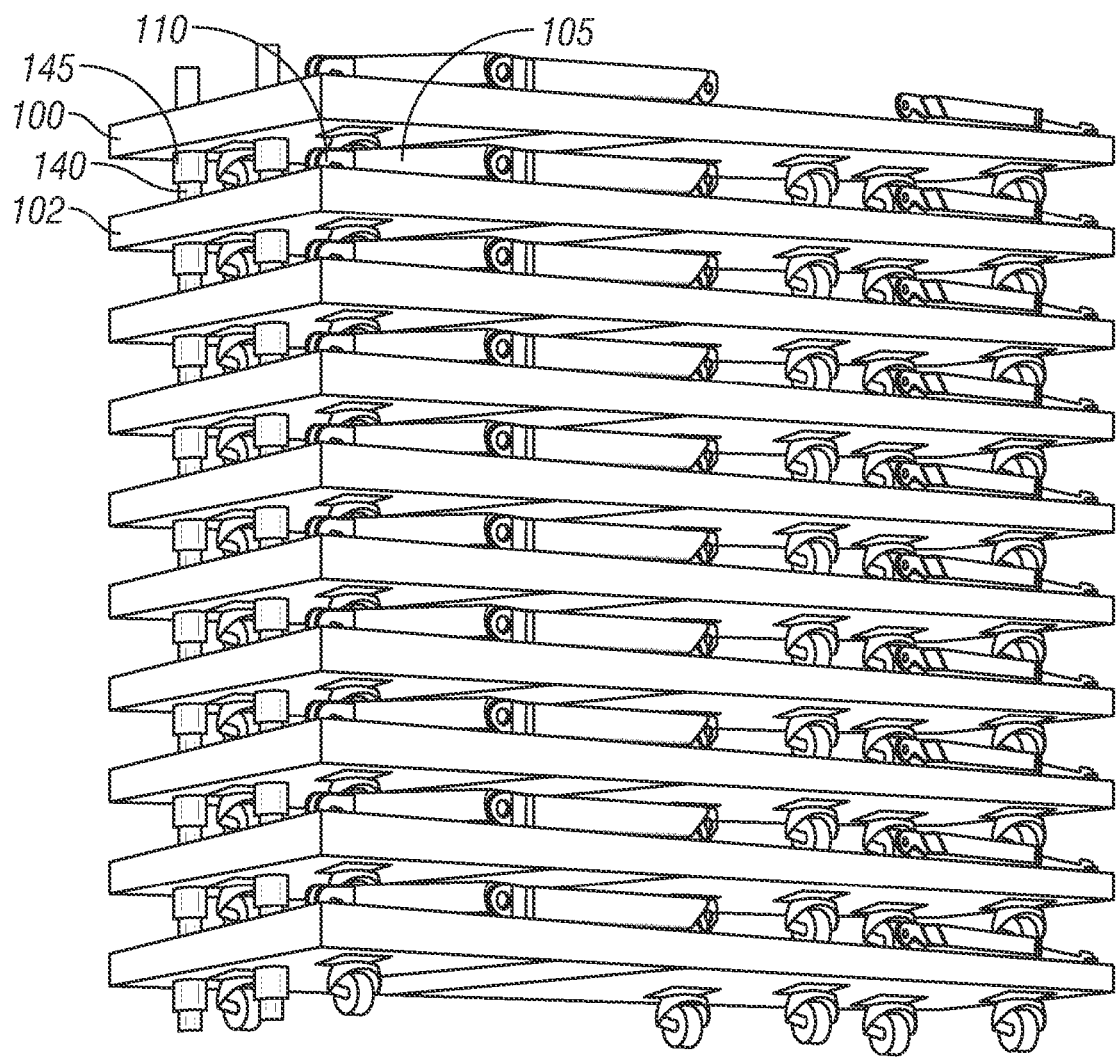
FIG. 1 shows a stack of folded dollys according to embodiments.
Figure 2:
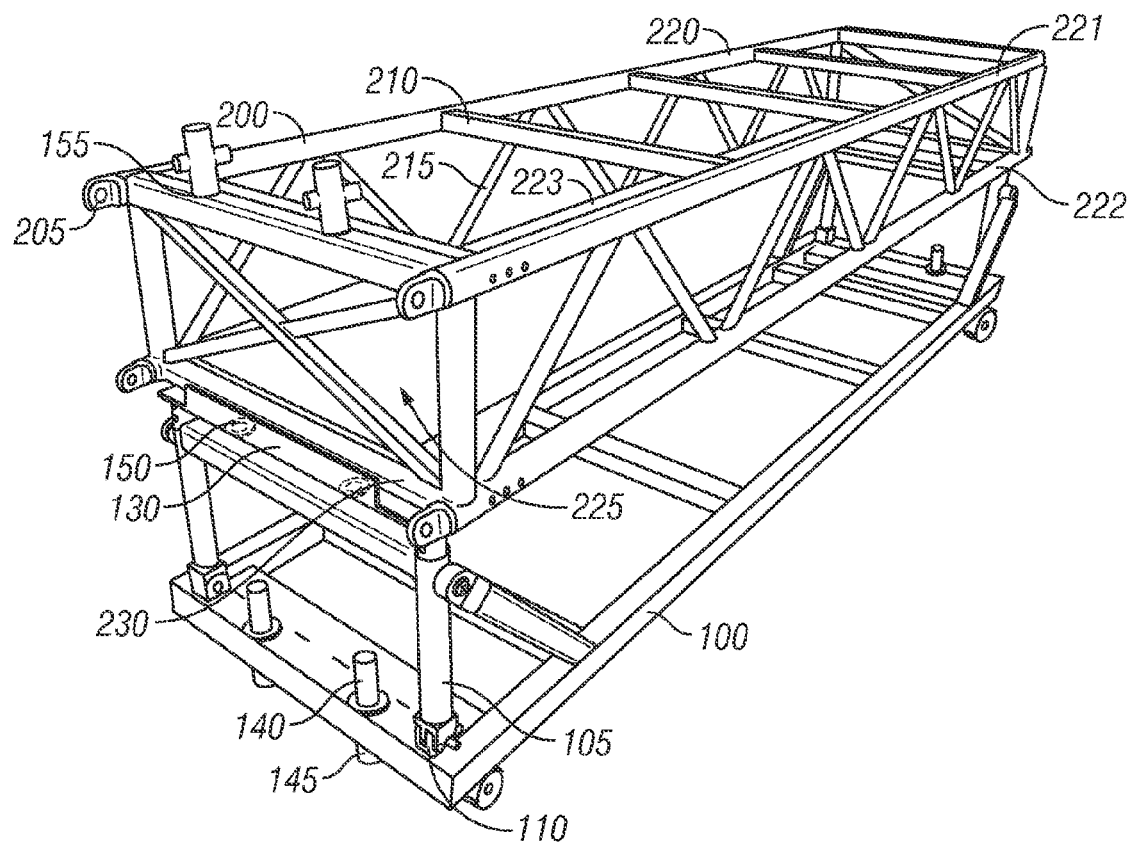
FIGS. 2 and 3 show the trusses and dollys from opposite sides.
Figure 3:
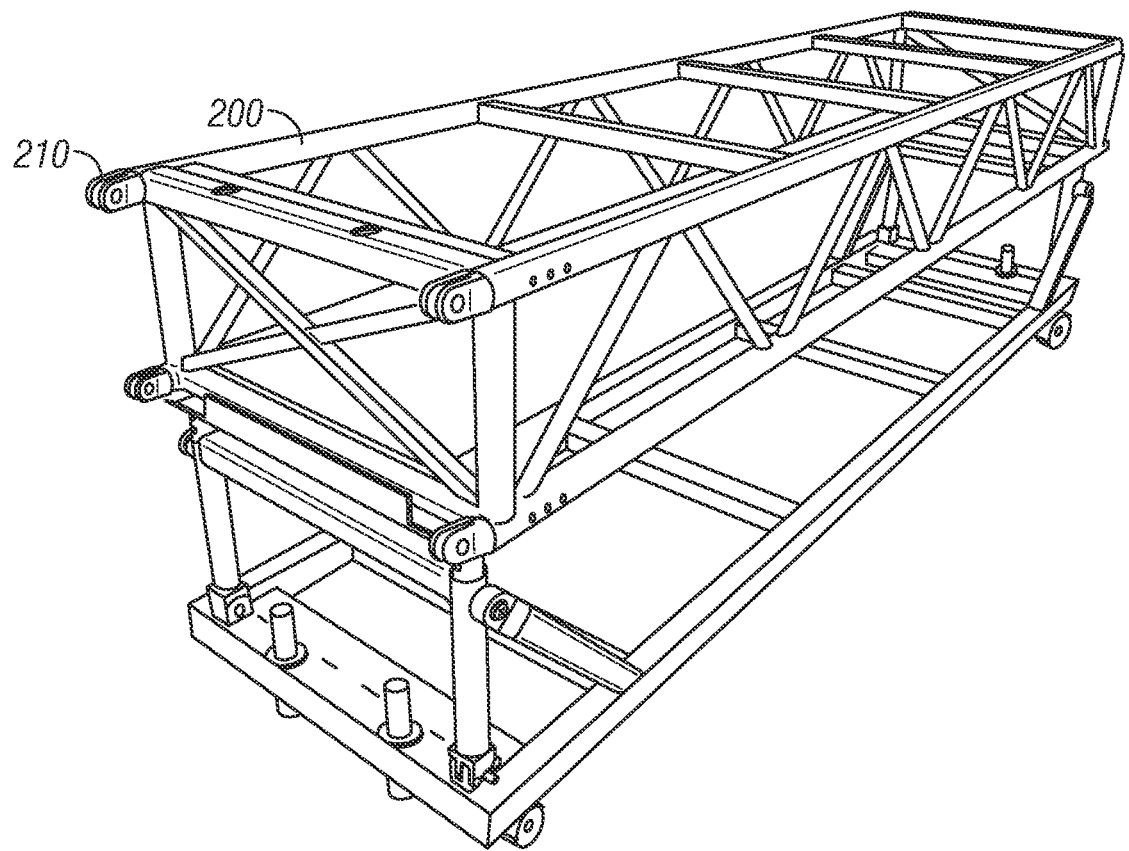

An embodiment is shown in FIGS. 1 through 3, where FIG. 1 shows a stack of folded dollys, and FIGS. 2 and 3 show the dollys from opposite sides.

FIGS. 2 and 3 illustrate the embodiment where truss 200 is mounted on top of the dolly 100. The dollys 100 in FIGS. 2 and 3 are shown in the extended and assembled position. The truss 200 includes a first male end 205, and a second female end 210 (shown in FIG. 3). The female end 210 of one truss attaches into the male end 205 of another truss. According to one embodiment, the connection between the male end and the female and uses a universal connector of the type described in U.S. Pat. No. 6,675,546, and available for sale from "Total Structures, Inc", Ventura, Ca.

The dollys have a dolly frame with wheels on its bottom surface. The frame also has a truss holding channel 130 that is movable by action of a pivotable channel holding arm 105.

Figure 6:
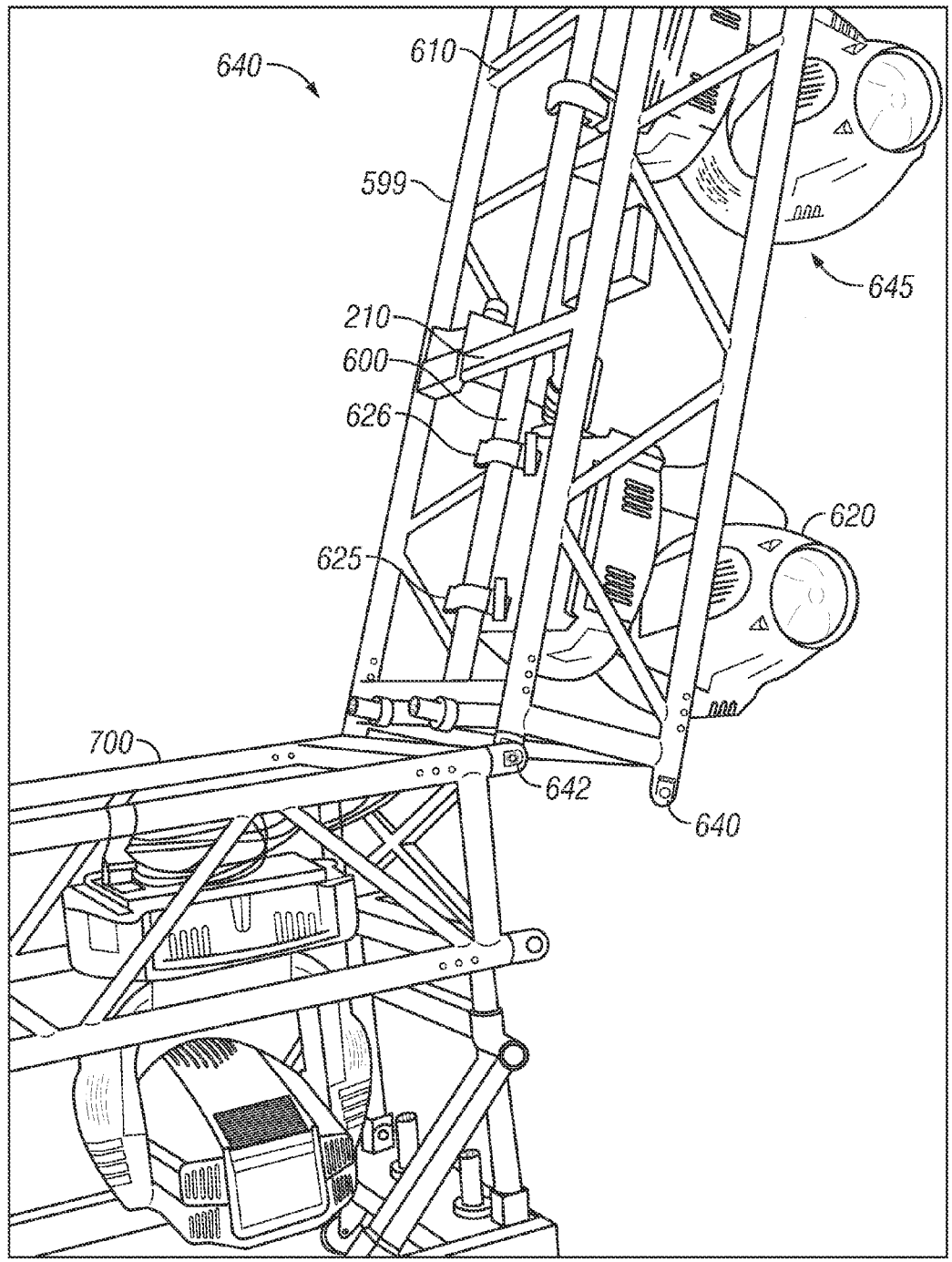
FIG. 6 shows a pair of trusses which are connected together, and are raised into a vertical position using a serpentine techniques.

Each of the dollies includes support pieces of various types. The truss in FIG. 2 includes unistruts 210 (e.g., a P3000 available from unistrut.com) and diagonal supports 215. The supports hold rigid the frame portions, formed of four tubular and/or rectangular frame portions 220. FIG. 6 illustrates how the unistruts 210 have connection parts that allow connecting a light supporting pole such as 600 between and along multiple unistruts such as between unit strut 210 and unistrut 610. The poles 600 are pre-drilled with holes which allow those poles to be connected at any location within the unistruts. Lighting devices such as 620 can be held on clamps 625, 626 that may attach at any location along the pole 600.

The lights are typically hung to extend within the area 225 defined between the structural portions 220, 221, 222, 223 while each of the trusses is held on a dolly 100. The lights as so hung extend inside the area defined between the supports.

Figure 4:
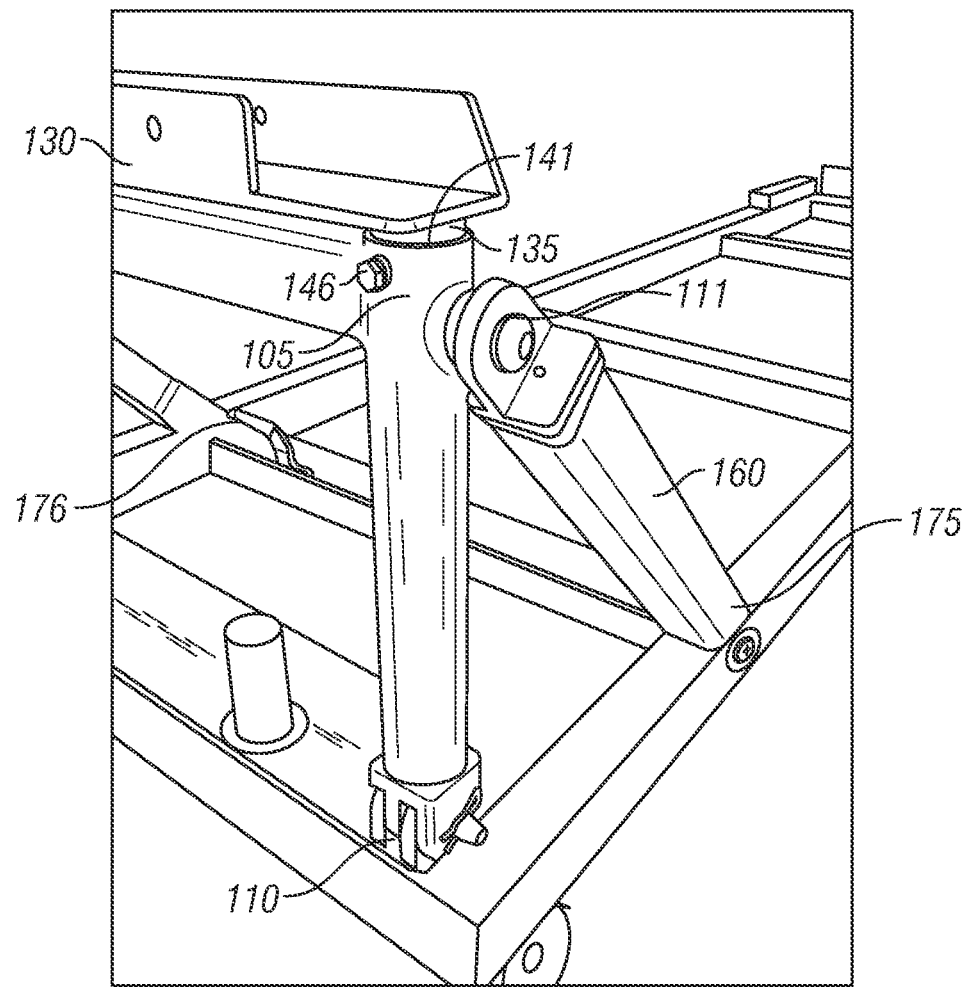
FIG. 4 shows a close up of the movable part.

The dolly includes a channel holding arm 105 that holds the channel 130, and swivels between the upright and structural portion shown in FIGS. 2-4, and a stowed or folded down position shown in FIG. 1 and described further herein. The dolly pivots on a pivot portion 110 which allows pivoting to the upright position and to the lowered position. While in the upright position, the bottom support part 230 of the truss is held within a corresponding channel 130 on the dolly and attached via a straight line action clamp 176, which holds the arm 160 are area 175.

Figure 5:
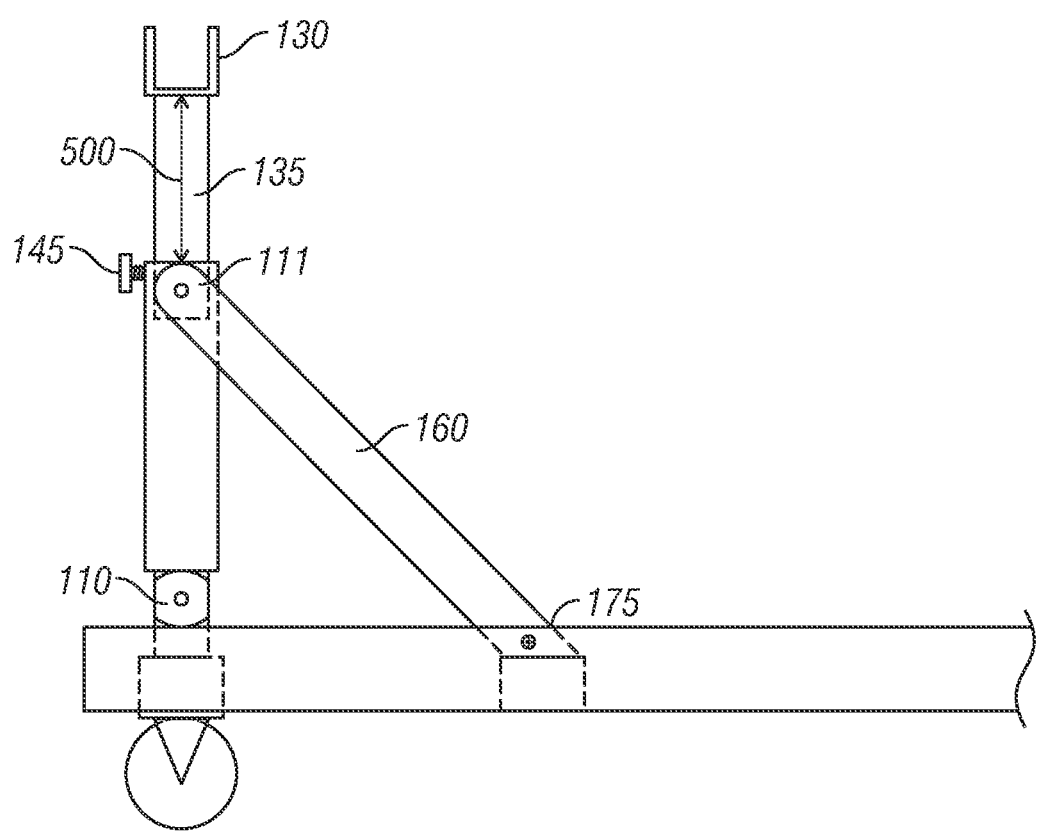
FIG. 5 shows a side view of the movable part.

The channel 130 can also be telescoped to a taller position, to allow larger lights to hang lower into the interior of the truss and dolly without hitting the floor. This allows for larger lights to be hung in this way. FIGS. 4 and 5 illustrate how the channel 130 is held on a support pole 135, which extends into a corresponding holding channel 110. The holding channel includes inner surfaces 141 which are sized to house the outer surface 135 of the telescoping pole. In addition, a bolt 146 can be removed to allow the channel 135 of the dolly portion to extend further upward and thereby telescope, after which the bolt 146 can be reinstalled. When the channel telescopes upward, the truss 200 is held up higher above the bottom surface of the dolly, thereby providing further room for lights.

Each of the dollies also includes a number of stacking peg portions. A stacking peg portion 140 fits within a corresponding receiving portion 145 within another dolly. For example, stacking peg portion 140 within a corresponding receiving portion on another dolly. When the dolly 100 is stacked with another dolly, the peg portions of the adjacent dollies are held one within the other.

The dollies can also be retracted to the retracted position shown in FIG. 1. In FIG. 1, each dolly such as 100, 102, is in the stowed position. In this stowed position, the arms 105 has been pivoted to a completely flat position. The flattened arms allow the dollies to be laid flat and stacked as shown in FIG. 1. Even though a high stack of dollies is possible such as the dolly stack shown in FIG. 1, these dollies are connected one to the other, such that receiving portion 145 on one of the dollies connect into the peg portions 140 on the other of the dollies. This provides vertical support to the dolly stack, thereby allowing them to be stacked very high without significant danger of falling over. The top surface of the truss may also have a male peg shown as 155.

In operation, the dolly portions can be pivoted on the first pivot 110, to place the upright support portion 140 in a substantially vertical position. The second pivot 111 is moved to place the other support portion 160 into for example a 45° angle. The second pivot pivots in a direction opposite to the pivoting direction of the first pivot. The support connection 175 is tightened to hold it in place.

FIG. 5 illustrates a side view of a hinged part, showing the hinges 110, 111, and showing the telescoping portion 130. The pole 135 can extent and retract as shown by the arrow 500. A bolt 146 holds the device in place. This can alternatively be a pin or quick release connection.

In the embodiment, the main supports of the dolly may be 2×3 rectangular aluminum tubes, and the edge support 160 may be a 2×2 square with 0.5"×2" tab on the bottom edge. The top portion may be a 2½ by ¼ inch channel.

In operation, the dolly can be extended between its contracted position shown in FIGS. 2 and 3, and its folded position shown in FIG. 1. When contracted as shown in FIG. 1, a number of the dollies can be stacked. When expanded as in its position in FIGS. 4 and 5, and in FIGS. 2 and 3, the dolly can hold an element of truss thereon, and it can expand and contract while holding the truss. Moreover, the structural elements which are added to this device can reduce the danger of high stacks of items.

Another feature of the truss of the present system is to control vertical hanging of the trusses by serpentine lifting of the truss off the dolly.

Figure 7:
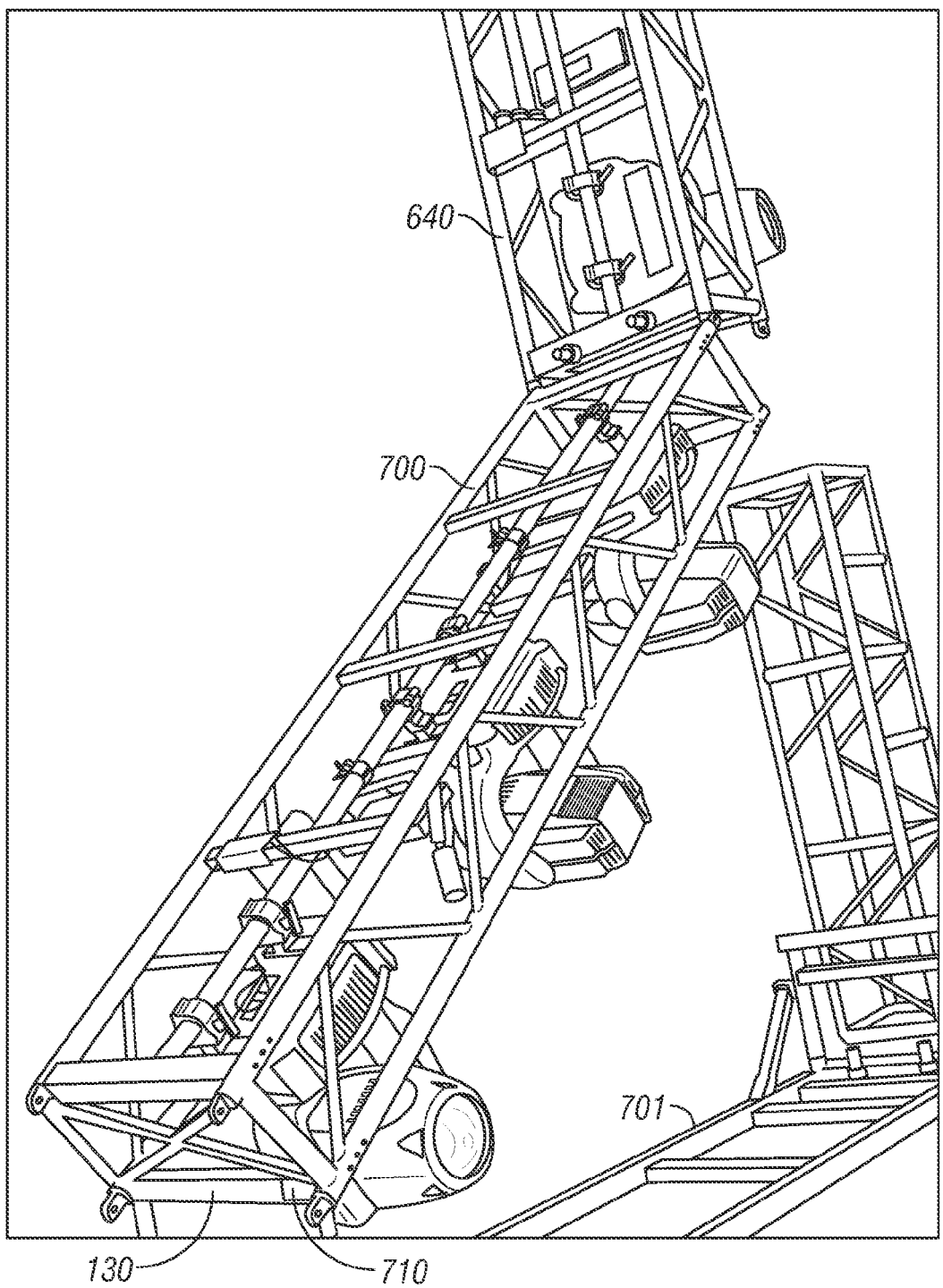
FIG. 7 shows further progress of the serpentine technique.

In this embodiment, multiple different trusses can be held together by attaching the male end 205 of one of the trusses to the female end 210 of another truss. These can be held by removable pins. In order to hang the trusses vertically, the bottom pin, from area, 640 is removed. The top pin 642 remains, and the truss can pivot on that top pin 642. A motor is then attached to one end of the truss, and the motor is moved to cause the truss to move upward in the direction of the arrow 645. As the truss moves upward, it pivots on the pin 642. FIG. 7 shows how once the first truss rises sufficiently, the second connected truss 700 also begins lifting off the ground. The bottom support part 710 of the truss pivots within the channel 130 of the Dolly, and the top part pivots on the pin 642. As the motor continues to run to lift the truss upward, eventually both trusses are raised into the vertical position. The movement of the first truss 599 upwards may be facilitated by the truss 700 and moving on its associated dolly 701.

Figure 8:
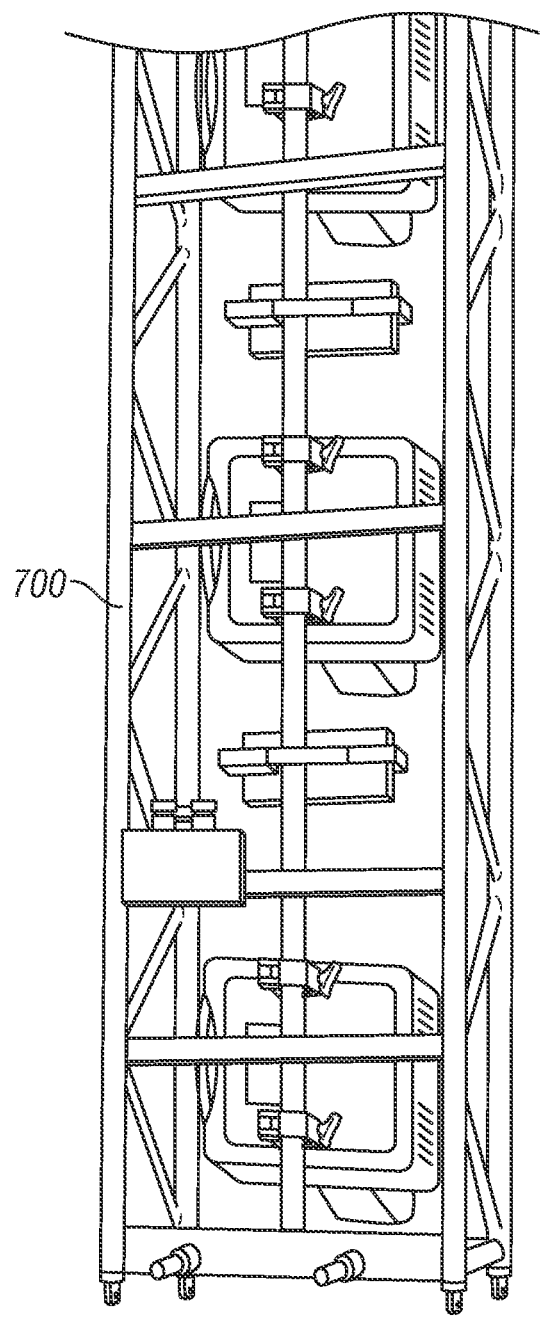
FIG. 8 shows the truss in the wholly vertical position off of the dolly.

FIG. 8 illustrates the truss 700, now off the Dolly and in its full upright position. The truss pieces 599 and 700 can then be attached by reattaching the pin back into 640. This motion of lifting the trusses into a vertical direction in this way is referred to as a serpentine motion, with there being at least two pivot points for the two trusses—a first pivot point between the two trusses and a second pivot point between the truss 700 and the dolly.

Figure 9:
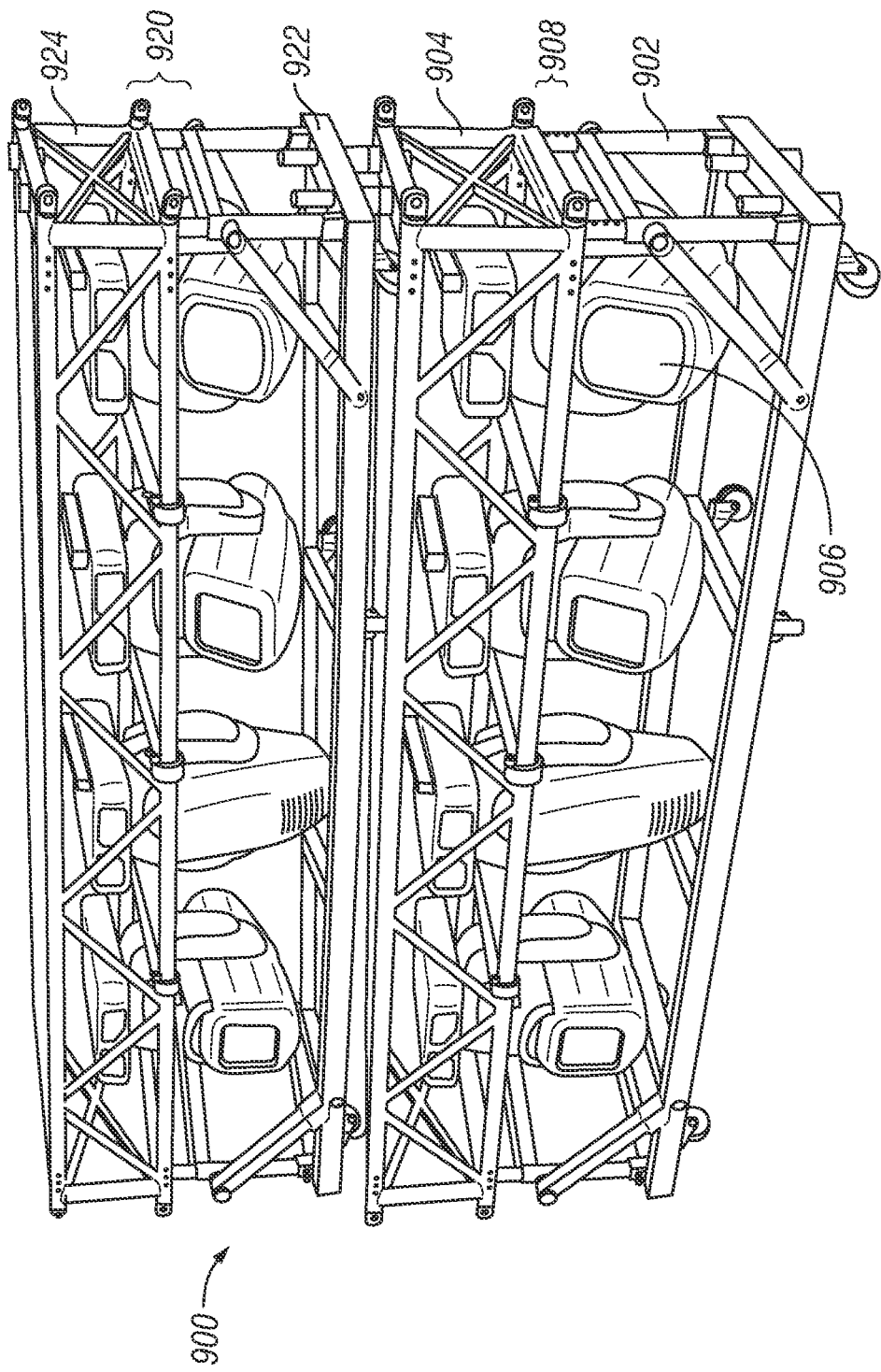
FIG. 9 shows a dual stacked dolly-and-truss configuration.

FIG. 9 illustrates another stacking configuration in which a first Dolly and truss stack 900 is stacked with a second dolly and truss stack 920. the Dolly 902 of the first stack has a truss 904 stacked thereon. The truss 904 has attached lights such as 906 which extend into the Dolly space. Note that Dolly 902 is telescoped by an amount 980. The Dolly can be telescoped by any desired amount to facilitate the moving lights on the truss while still on the Dolly.

However, more stacking of the Dolly means that the dollies become higher. The moderately telescoped configuration shown in FIG. 9 might still be low enough to fit on a truck with two Dolly stack. However, as the trusses telescope more, it may form the dolly stack too high to fit on a truck, and prevent this being from being stacked in the truck.

The top truss 924 is connected to a bottom Dolly 922 of the second truss Dolly combination. The Dolly 922 holds the truss 924. Again, the truss 924 is already has the lights loaded thereon and wired. The dollys can be stacked as shown in FIG. 9 using a forklift, and then rolled on to trucks in their stacked positions, thereby using the truck space more effectively.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other materials and sizes can be used. Any kind of hangable light, or any equipment that can be truss mounted can be mounted in this way.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A dolly for a truss, comprising:
   a dolly frame, having a support surface with plural wheels on a bottom surface of the support surface, and a movable truss holding arm, where said truss holding arm has a channel structure shaped to hold a truss;
   said truss holding arm pivots on a first pivot to a truss holding position where said truss holding arm faces substantially vertically and said channel structure faces substantially horizontally in a direction to hold a truss in said channel structure, said channel structure held a first distance above the surface of the frame when in said truss holding position, and said channel structure also pivots on said first pivot to a stowed position where said channel structure faces in a direction where said channel structure cannot hold said truss in said channel structure, and wherein, in said stowed position, said channel structure is a second distance from the surface of the frame, shorter than said first distance,
   wherein the dolly further comprises a truss having support pieces with outer surfaces that are sized to fit into said channel structure on said dolly.

2. A dolly as in claim 1, wherein said channel structure is movable relative to the truss holding arm, movement of said channel structure
   changes a distance of said channel structure relative to a support structure of said dolly frame.

3. A dolly as in claim 1, wherein said truss holding arm pivots between said truss holding position and said stowed position.

4. A dolly as in claim 3, wherein said truss holding arm in said truss holding position is held by a support piece that is pivotally attached to said dolly frame by a second pivot, said support piece extending at a non 90 degree angle between an area near a top portion of said truss holding structure and said dolly frame and held relative to said dolly frame.

5. A dolly as in claim 4, wherein said first and second pivot parts pivot in opposite directions.

6. A dolly as in claim 1, wherein said dolly frame includes stacking structures which define a position of stacking to other dollies.

7. A dolly as in claim 6, wherein said stacking structures include first male portions that extend in one direction of the bottom surface of said dolly, and second female portions extending in another direction on the bottom surface of said dolly and receiving said male portions therein.

8. A dolly as in claim 1, wherein said channel structure is rectangular in cross section.

9. A dolly as in claim 1, wherein said truss has male portions at one end and female portions at another end that mate with male portions on another end of another truss.

10. A dolly for a truss, comprising:
a dolly frame, having a support surface with plural wheels on a bottom surface of the support surface, and a truss holding arm, where said truss holding arm has a channel structure shaped to hold a truss;
said channel structure is extendable relative to the truss holding arm, and where extending of said channel structure changes a distance of said channel structure relative to the support surface of the frame, said channel structure held a first distance above the surface of the frame when in said truss holding position in a non-extended position, and held a second distance above the surface of the frame, higher above the surface of the frame, when in a second extended position, wherein said truss holding arm is pivotable between a stowed position and an upright position and said truss holding portion pivots on a first pivot to said upright position where said truss holding arm faces substantially vertically and said channel structure faces substantially horizontally to allow holding a truss in said channel structure, and said channel structure also pivots on said first pivot to a stowed position where said channel structure is not in a position to hold said truss thereon and said channel structure faces in a direction where said channel structure cannot hold said truss therein, and said channel structure is a second distance from the surface of the frame, shorter than said first distance,
wherein the dolly further comprises a truss having support pieces with outer surfaces that are sized to fit into said channel structure on said dolly.

11. A dolly as in claim 10, wherein said truss holding arm pivots between said truss holding position and said stowed position.

12. A dolly as in claim 11, wherein said truss holding arm in said truss holding position is on a first pivot, and is held by a support piece that is pivotally attached to said dolly frame by a second pivot, said support piece extending at a non 90 degree angle between an area near a top portion of said truss holding structure and said dolly frame and held relative to said dolly frame.

13. A dolly as in claim 12, wherein said first and second pivot parts pivot in opposite directions.

14. A dolly as in claim 10, wherein said dolly frame includes stacking structures which define a position of stacking to other dollies.

15. A dolly as in claim 14, wherein said stacking structures include first male portions that extend in one direction of the bottom surface of said dolly, and second female portions extending in another direction on the bottom surface of said dolly and sized to receive said male portions from another dolly therein.

16. A dolly as in claim 10, further comprising a truss having support pieces with outer surfaces that are sized to fit into said channel portions on said dolly.

17. A dolly as in claim 10, wherein said truss has male portions at one end and female portions at another end that mate rotatable with male portions on another end of another truss.

18. A dolly for a truss, comprising:
a dolly frame, having a support surface with plural wheels on a bottom surface of the support surface, and a movable truss holding arm, where said truss holding arm has a channel structure having an inner surface shaped to hold a truss;
said channel structure held above the surface of the frame when in a truss holding position, wherein said dolly frame includes stacking structures which define a position of stacking to other dollies, wherein said stacking structures include first male portions that extend in one direction of the bottom surface of said dolly, and second female portions extending in another direction on the bottom surface of said dolly and sized to receive said male portions from another dolly therein, wherein said truss holding arm is pivotable between a stowed position and an upright position and said truss holding portion pivots on a first pivot to said upright position where said truss holding arm faces substantially vertically and said channel structure faces substantially horizontally to allow holding a truss in said channel structure, and said channel structure also pivots on said first pivot to a stowed position where said channel structure is not in a position to hold said truss thereon and said channel structure faces in a direction where said channel structure cannot hold said truss therein, and said channel structure is a second distance from the surface of the frame, shorter than said first distance,
wherein the dolly further comprises a truss having support pieces with outer surfaces that are sized to fit into said channel structure on said dolly.

19. A system as in claim 18, wherein said movable truss holding arm is extendable to extend above a surface of the dolly.

20. A dolly for a truss, comprising:
a dolly frame, having a support surface with plural wheels on a bottom surface of the support surface, and a movable truss holding arm, where said truss holding arm has a channel structure having an inner surface shaped to hold a truss;
said channel structure held above the surface of the frame when in a truss holding position, wherein said dolly frame includes stacking structures which define a position of stacking to other dollies, wherein said stacking structures include first male portions that extend in one direction of the bottom surface of said dolly, and second female portions extending in another direction on the bottom surface of said dolly and sized to receive said male portions from another dolly therein, wherein said truss holding arm is pivotable between a stowed position and an upright position and said truss holding portion pivots on a first pivot to said upright position where said truss holding arm faces substantially vertically and said channel structure faces substantially horizontally to allow holding a truss in said channel structure, and said channel structure also pivots on said first pivot to a stowed position where said channel structure is not in a position to hold said truss thereon and said channel structure faces in a direction where said channel structure cannot hold said truss therein, and said channel structure is a second distance from the surface of the frame, shorter than said first distance, wherein the dolly further comprises a truss having support pieces with outer surfaces that are sized to fit into said channel structure on said dolly.

21. A system as in claim 20, wherein said movable truss holding arm is movable between a vertical position and a stowed horizontal position.

22. A system as in claim 20, wherein said movable truss holding arm is movable to extend above a surface of the dolly.

* * * * *